(12) United States Patent
Garfield

(10) Patent No.: US 10,738,815 B2
(45) Date of Patent: Aug. 11, 2020

(54) SWIVEL ANCHOR WITH PREVENTION OF ANCHOR ARM RETRACTION

(71) Applicant: Theodore Garfield, Old Greenwich, CT (US)

(72) Inventor: Theodore Garfield, Old Greenwich, CT (US)

( * ) Notice: Subject to any disclaimer, the term of this patent is extended or adjusted under 35 U.S.C. 154(b) by 0 days.

(21) Appl. No.: 15/718,653

(22) Filed: Sep. 28, 2017

(65) Prior Publication Data

US 2018/0172050 A1    Jun. 21, 2018

Related U.S. Application Data

(60) Provisional application No. 62/400,965, filed on Sep. 28, 2016.

(51) Int. Cl.
*F16B 13/04* (2006.01)
*F16B 13/08* (2006.01)

(52) U.S. Cl.
CPC ................. *F16B 13/0808* (2013.01)

(58) Field of Classification Search
CPC ............... F16B 13/0808; F16B 21/02
USPC .......................... 411/340, 345, 349
See application file for complete search history.

(56) References Cited

U.S. PATENT DOCUMENTS

| | | | | |
|---|---|---|---|---|
| 1,878,579 A | * | 9/1932 | Gober ................. | F16B 13/08 220/327 |
| 2,403,247 A | * | 7/1946 | Sullivan ............... | F16B 5/02 411/261 |
| 3,319,510 A | * | 5/1967 | Rapata ................ | F16B 19/1081 24/297 |
| 3,490,300 A | * | 1/1970 | Toma .................. | F16B 5/126 24/292 |
| 5,044,854 A | * | 9/1991 | Oh ..................... | F16B 13/0808 411/344 |
| 5,437,515 A | * | 8/1995 | Kuramoto .......... | F16B 21/165 403/154 |
| 6,886,712 B2 | * | 5/2005 | Hansel ............... | B62D 25/24 220/359.4 |
| 9,039,338 B2 | * | 5/2015 | Kaye .................. | F16B 13/0808 411/349 |

* cited by examiner

*Primary Examiner* — Flemming Saether
(74) *Attorney, Agent, or Firm* — Israel Nissenbaum; Yitzy Nissenbaum

(57) ABSTRACT

High strength swivel anchors, are configured for insertion through an aperture in a substrate while in a minimal configuration and expandable behind the substrate for anchoring engagement thereto. The anchor herein has at least two pivotally attached elongated anchoring arms with the arms being swivelable relative to each other in a single plane from the minimal configuration wherein the anchoring arms are coextensive to an expanded anchoring engagement position wherein the anchoring arms cross each other through a point of pivotal attachment. The anchor herein further comprises a structural element which retards retraction of swiveling movement of the anchoring arms from the minimal configuration to the expanded anchoring engagement position.

2 Claims, 2 Drawing Sheets

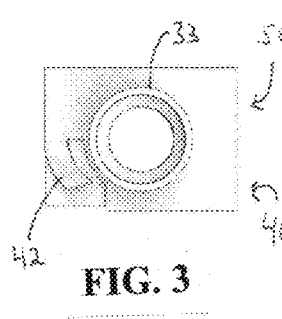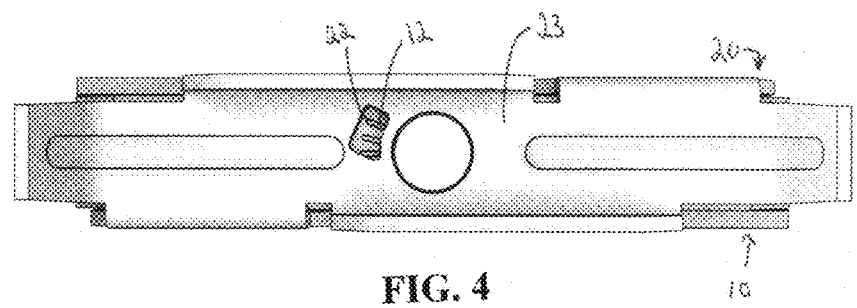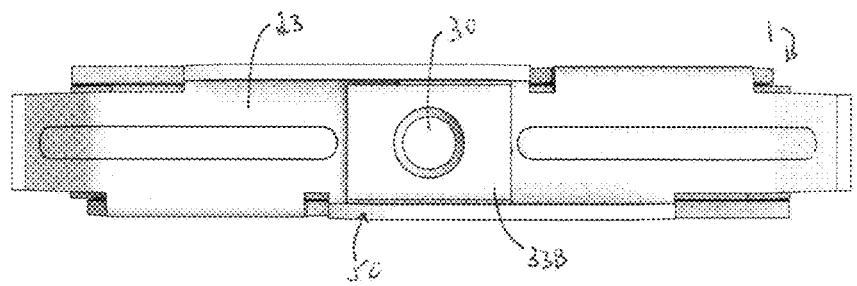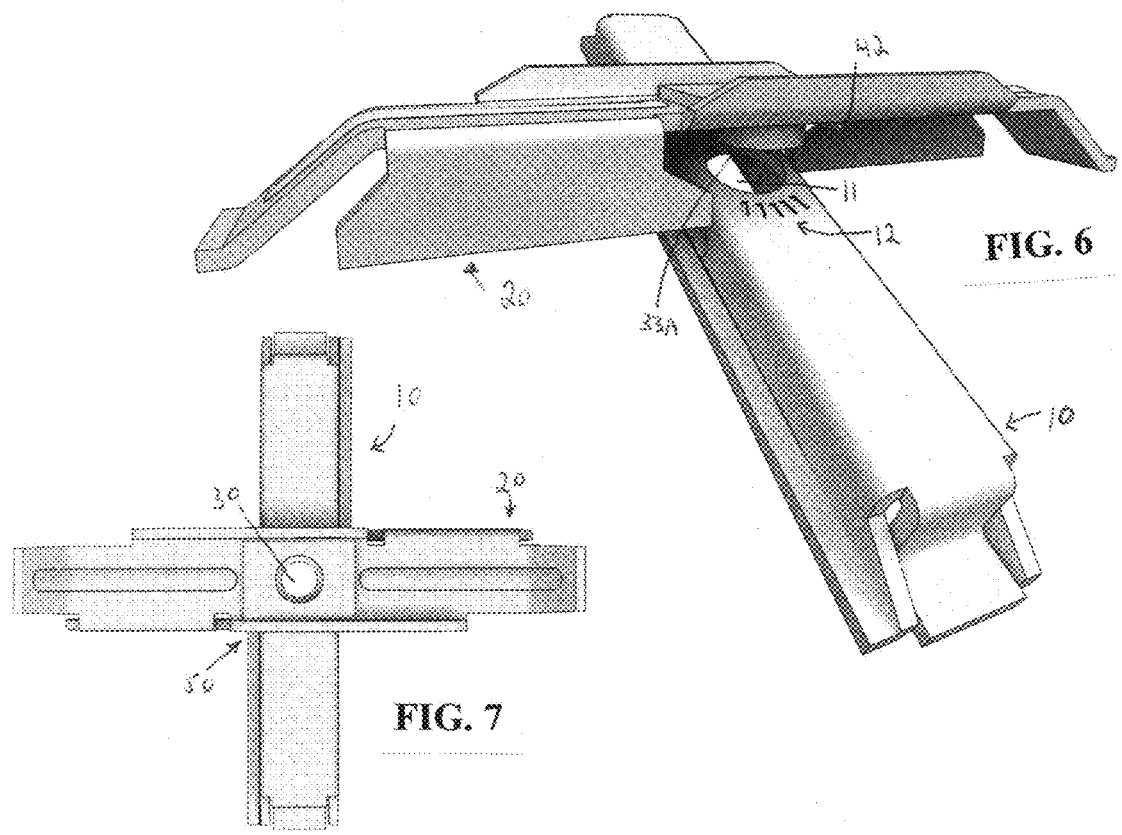

SWIVEL ANCHOR WITH PREVENTION OF ANCHOR ARM RETRACTION

FIELD OF THE INVENTION

This invention relates to improvements in swivel anchors having multiple swiveling arms and particularly relates to maintaining extended position of the arms without inadvertent swiveling retraction or collapsing of the arms.

BACKGROUND

A very high strength swivel anchor for holding relatively heavy weights on substrates, such as gypsum board, is disclosed in U.S. Pat. No. 9,039,338, issued on May 26, 2015, to the same assignee as the present invention, with the disclosure thereof being entirely included herein by reference thereto.

A specific structure is shown and described in the aforementioned patent of a collapsed structure of two swivably connected anchor arms for insertion into a minimal size insertion aperture in a substrate, such as a wall. The connected arms are remotely swivelable in a plane parallel to the substrate to effectively at least double load bearing contact of the anchor arms with the substrate in a full 180° range. To ensure such full range a swivel stop on the anchor arms is configured to prevent the arms of the anchor from moving beyond an optimum expanded position of perpendicular intersection of the arms. There is however no mechanism or structure which may serve to prevent the anchor from inadvertently retracting from the optimum position. Unseen elements, such as studs, wiring, pipes and the like may unknowingly cause a swiveling retraction of the anchor arms from the fully extending position, thereby reducing holding strength. Since anchors for holding objects to substrates are generally used in applications wherein the other side of the substrate, such as a wall, is both inaccessible and out of view of the installer, such deviations of the anchor arms from optimum expansion, such as by retraction of the arms from the optimum expansion (e.g., with abutting contact of the opened arms with obstructions, such as wall studs), are possible without knowledge of the installer.

SUMMARY OF THE INVENTION

It is accordingly an object of the present invention to provide a method and structure for a swivel anchor having arms which swivel apart to assume an optimum holding position behind a wall or substrate. The anchor embodies a structure which substantially prevents the anchor arms from retracting towards an original closed or minimal substrate insertion position during or after the arms have been swiveled to an optimal expanded load bearing position.

Generally, the present invention comprises a method and device for preventing a swivel arm anchor with arms, which are swiveled apart after the anchor is inserted into and positioned behind a substrate or wall, from inadvertently closing or collapsing to an unexpanded position during installation. The device comprises a structure included within the anchor having engaging members which substantially retard or prevent reverse swivel movement toward the original closed anchor configuration assumed by the anchor for anchor insertion into the wall or substrate.

High strength swivel anchors, as in said patent, are configured for insertion through an aperture in a substrate while in a minimal configuration and expandable behind the substrate for anchoring engagement thereto. The anchor has at least two pivotally attached elongated anchoring arms with the arms being swivelable relative to each other in a single plane from the minimal configuration wherein the anchoring arms are coextensive to an expanded anchoring engagement position wherein the anchoring arms cross each other through a point of pivotal attachment. The anchor herein further comprises a structural element which retards retraction of swiveling movement of the anchoring arms from the minimal configuration to the expanded anchoring engagement position.

In an embodiment of the high strength anchor the anchoring arms comprise elements which are configured to engage with each other and which permit the swiveling to the expanded anchoring engagement position but which retard reverse retraction swiveling toward the minimal configuration position.

In a further embodiment, the high strength anchor has a first of the anchoring arms with at least two depressions in a surface thereof facing a second of the anchoring arms. The second of the anchoring arms corresponding comprises an extending tooth member extending toward the depressions and is engaged therewith at an angle whereby the swiveling toward the expanding anchoring engagement position is permitted but retraction movement is retarded. The depression are positioned in an arc corresponding to the swiveling arc between anchor arms in order to maintain relative positions during the swiveling movement.

In a further refinement of the invention, wherein the tooth member extends from a member separated from the second of the anchoring arms but which fixedly engaged therewith.

The method of the invention comprises the step of including a mechanism or structure within an anchor, containing elements which swivel relative to each other from a minimal to an expanded position, which retards or prevents inadvertent or unwanted retraction of the swiveling movement. In an embodiment of the invention, the mechanism comprises the inclusion or interactive engaging elements between the respective swiveling components.

In an embodiment of the invention, a pawl or tooth engaging structure, and a pawl or extending tooth are embodied in and between the anchor arms. Swivel opening of the anchor arms into the optimal position is substantially unimpeded, while retraction of the swiveled arms, toward the closed position, is retarded or prevented by engagement of the pawl or extending tooth with an engaging structure such as corresponding ratchet teeth or depressions (short channel elements), which facilitate one way movement (in the direction of swivel anchor expansion).

In one embodiment, the pawl is in the form of an angled extension member or tooth of a metal element fixed or integral with one of the anchor arms and configured to engage corresponding ratchet teeth or depressions connected with or integrated with the other of the anchor arms. The pawl or tooth is angled to permit spring-like raking movement of the tooth along the surface of the other anchor arms and the ratchet teeth or depressions and wherein the angled configuration cause the pawl or tooth to fall into a depression and engage a wall of the depression with an end of the tooth or pawl to resist reverse or retraction motion.

In another embodiment, the pawl is in the form of a leaf spring imbedded in one of the anchor arms with a tensioned edge engaging the ratchet teeth.

The pawl may be integral with or part of one of the anchor arms and the engaging structure is integral with or part of the other anchor arm. The term "integration" as used herein includes both formation of the ratchet and/or pawl as part of the anchor arms or alternatively as separate elements included in the overall anchor structure or combination of formation inclusion and separate elements. Other one way engagement mechanisms and ratchet/pawl structures are possible with a function of one way relatively free swivel movement and a retarded reverse swivel movement.

In an embodiment of the invention, a temporary locking engagement is effected between a bolt inserted into the anchor arms, which is used to effect the swivel open movement between the arms, such as with a temporary adhesive such as Loctite® adhesive to provide sufficient resistance to overcome any drag by the pawl against the ratchet during swivel movement of the arms. Other mechanical or adhesive elements are similarly utilizable to effect the requisite anchor swiveling resistance.

In situations wherein the inserted anchor is abutted against an obstruction such as a stud and full swiveling opening cannot be effected, the reverse movement retarding structure maintains the anchor in the optimal opened position against any forces exerted by the obstruction.

The above and other objects, features and advantages of the invention are more clearly evident from the photograph drawings in which:

SHORT DESCRIPTION OF THE DRAWINGS

FIG. 3 is a bottom view of the pivot member and ratchet tooth member of FIG. 1, as connected for assembly into the anchor;

FIG. 4 is a top view of the upper and lower swivel anchor arms of the anchor, as nested in an unexpanded form, and showing the exposed ratchet tooth engaging depressions in the upper surface of the lower swivel anchor arm;

FIG. 5 is the top view of FIG. 4 upon which the connected pivot member and ratchet tooth member of FIG. 3 is obverted and positioned with the ratchet tooth fitted against the engaging depressions of FIG. 4;

FIG. 6 is a front tilted view of the anchor of FIG. 5 in an expanded configuration showing alignment of the ratchet tooth and engaging depressions and alignment of the component apertures for insertion of the connecting swivel pivot member; and FIG. 7 is a top view of the anchor of FIG. 6 as completed and expanded by swiveling.

DETAILED DESCRIPTION AND DESCRIPTION OF THE DRAWINGS

Figure 1:
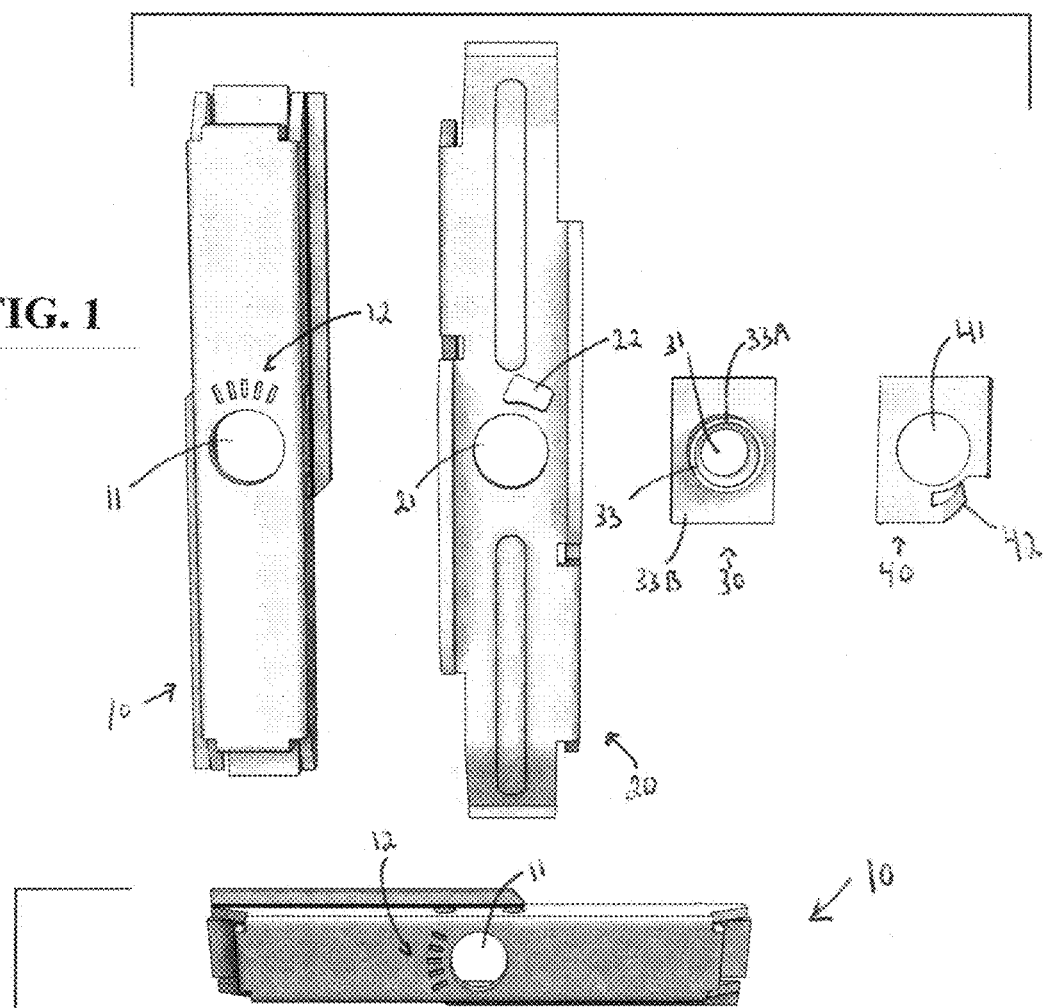
FIG. 1 depicts the separated components of the swivel anchor with upper and lower swivel anchor arms, pivot member and ratchet tooth member.
Figure 2:
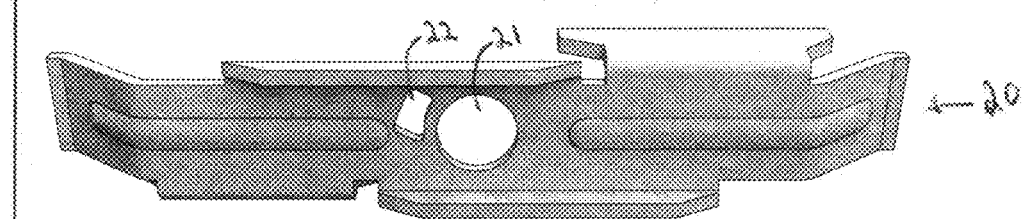
FIG. 2 is an aligned standing view of the anchor components of FIG. 1 in an assembly alignment.
Figure 2:
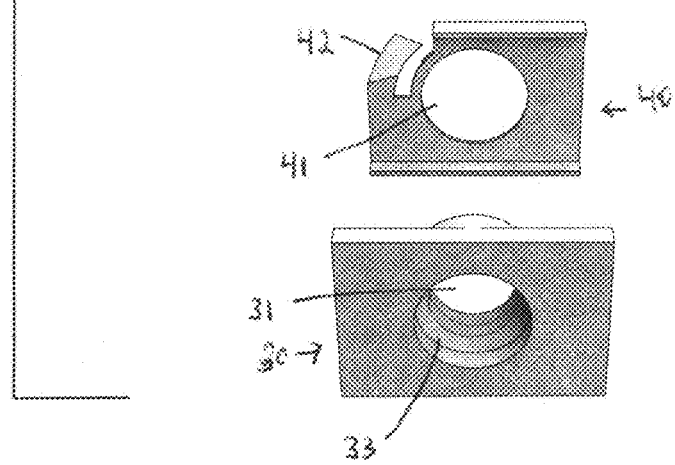

With reference to the drawings, FIGS. 5 and 7 show a high strength swiveling anchor 1 in a minimal or collapsed configuration for insertion in a substrate and an expanded swiveled open position after insertion, for holding strength engagement with the substrate, respectively. FIG. 1 shows the four components of an embodiment of the present invention, as included in the anchor of FIGS. 5 and 7, of an expanding high strength swivel arm anchor with a structure which retards or prevents retraction from the swiveling expansion. The swivel anchor arms 10 and 20 are lower and upper anchoring elements which operably nest with each other, as shown in FIGS. 2 and 4 and, as described in detail in U.S. Pat. No. 9,039,338, as referred to above. The swivel anchor arms 10 and 20 are configured to swivel apart by remote operation to effect enhanced holding strength. This swiveling is constrained by the anchor arm structures to be in a single direction, as described in said patent.

Swivel anchor arms 10 and 20 are connected via internally threaded pivoting post 33 of pivot member 30 which is aligned with and extends downwardly through apertures 11 and 21 of swivel anchor arms 10 and 20, as more clearly shown in FIGS. 2 and 6. Pivoting post 33 has a height sufficient to extend through the nested arms 10 and 20 with terminal pivoting post end 33A being peened over to lockingly engage the lower surface of lower anchoring element 10. The other end of pivoting post 33 is integrated with an apertured rectangular plate element 33B which is securely seated in a sized channel 23 in the upper anchor arm 20, as shown in FIGS. 5 and 7, where it is held against rotation during anchor installation and subsequent bolt insertion.

In operation, as described in said patent, the lower anchor arm 10 is held against a substrate and the upper anchor arm 20 is swiveled around pivoting post 33 to the expanded configuration shown in FIG. 7, at which point, a bolt (not shown) for load supporting is threadingly inserted into threaded pivoting post 33, as shown, and described in said patent.

The four component elements 10, 20, 40 and 30 are shown in alignment and position in exploded view of FIG. 2, prior to assembly, with the respective apertures 11, 21, 41 and 31 being in alignment. Tooth 42 of ratchet tooth member 40 is also aligned with access aperture 22 in upper anchor arm 20 and a series of engaging depressions 12 in the upper surface 13 of lower arm 10. FIG. 6 depicts the alignment of apertures 11, 21, 41, and 31 as well as the positioning of tooth 42 through access aperture 22 with the tooth 42 engaging one of engaging depressions 12 or in a track therebetween. The series of depressions permit an intermediate (as needed, such as resulting from unseen obstructions) swivel opening between the anchor arms with retarded swivel retraction FIG. 4 shows the nesting of lower and upper anchor arms 10 and 20 prior to placement of the assembly 50 of ratchet tooth member 40 and pivot member 30 shown in FIG. 3. Engaging depressions 12 are visible through access aperture 22 in upper anchor arm 20. FIG. 5 shows the nested lower and upper anchor arms 10 and 20 with assembly 50 in place within channel 23.

It is understood that the above description and drawings with respect to an embodiment herein is merely exemplary of the invention with changes in structure, component, relative relationships and the like being possible without departing from the scope of the invention as defined in the following claims.

What is claimed is:

1. A high strength anchor comprised of anchoring arms which are configured for insertion through an aperture in a substrate while the anchoring arms are in a minimal configuration and which are expandable behind the substrate for anchoring engagement to a distal surface of the substrate, the anchor having at least two pivotally attached elongated anchoring arms with the arms being swivelable relative to each other in a single plane from the minimal configuration wherein the anchoring arms are coextensive to an expanded anchoring engagement position wherein the anchoring arms cross each other through a point of pivotal attachment, wherein the anchor comprises a structural element either integral with the anchor arms or as an element separate from the anchor arms which retards unintended retraction of swivelling expandable movement of the anchoring arms from the minimal configuration to the expanded anchoring engagement position, wherein a first of the anchoring arms or structural element comprises at least two depressions in a surface thereof facing a second of the anchoring arms and wherein the second of the anchoring arms or structural element comprises an extending tooth member extending toward the depressions and engaged therewith at an angle whereby the swiveling toward the expanding anchoring engagement position is permitted but retraction movement is retarded.

2. The high strength anchor of claim 1, wherein the tooth member extends from the structural element separated from the second of the anchoring arms but fixedly engaged therewith.

* * * * *